Figure 1:
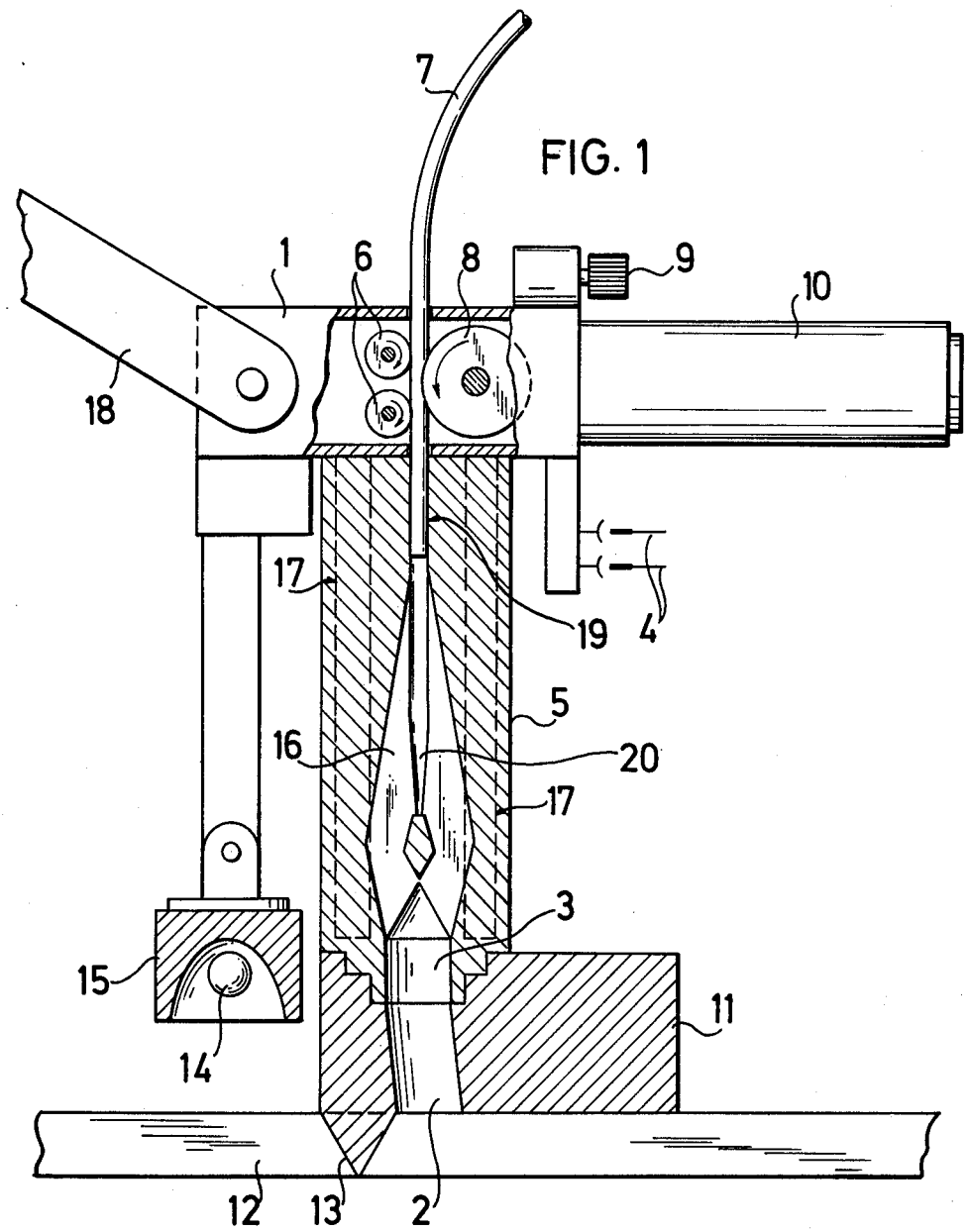

United States Patent [19]

Lüke et al.

[11] 4,069,087

[45] Jan. 17, 1978

[54] APPARATUS FOR WELDING ARTICLES OF THERMOPLASTS

[75] Inventors: Johannes Lüke; Willy Muth, both of Frankfurt am Main; Wolfgang Riederer, Hofheim, Taunus; Gunter Wenzel, Kelkheim, Taunus, all of Germany

[73] Assignee: Hoechst Aktiengesellschaft, Frankfurt am Main, Germany

[21] Appl. No.: 728,542

[22] Filed: Oct. 1, 1976

[30] Foreign Application Priority Data

Oct. 4, 1975 Germany ............................ 2544492

[51] Int. Cl.² ........................ B32B 31/12; B32B 31/30
[52] U.S. Cl. .................................... 156/391; 156/499; 156/500; 156/546; 156/574; 156/578; 156/579
[58] Field of Search ............... 156/244, 304, 391, 499, 156/500, 502, 509, 546, 574, 575, 579, 583, 497, 578; 425/378 R, 131.1, 113, 392

[56] References Cited

U.S. PATENT DOCUMENTS

| | | | |
|---|---|---|---|
| 2,962,759 | 12/1960 | Maccaferri | 425/378 X |
| 3,580,789 | 5/1971 | Wenzel | 156/497 |
| 3,713,947 | 1/1973 | Hawkins | 156/579 X |

Primary Examiner—William A. Powell
Assistant Examiner—M. G. Wityshyn
Attorney, Agent, or Firm—Curtis, Morris & Safford

[57] ABSTRACT

The apparatus for welding articles of thermoplasts using additional welding material is provided with a special melting device for the welding material. The melting device comprises a guide channel for the supply and preheating of the welding material, which channel merges into a melting channel of diminishing cross section closed at one end. The melting channel is provided with lateral bores which discharge into a melting chamber of low height in communication with a collecting zone for the plasticized welding material, which collecting zone is connected with the outlet opening of the welding shoe.

5 Claims, 3 Drawing Figures

APPARATUS FOR WELDING ARTICLES OF THERMOPLASTS

This invention relates to an apparatus for welding articles of thermoplasts with welding material, i.e., welding rods, which apparatus comprises feeding means and a melting device for the welding material, a welding shoe joined to the melting device with an outlet opening for the welding material, a smoothing element and a guide element as well as heating means for the melting device and for heating the joint.

Swiss Pat. No. 343,120 describes a welding apparatus with feeding means for the welding wire. According to one embodiment the described apparatus comprises a preheating device for the welding wire in the form of a heatable sleeve. The advance of the welding apparatus is achieved by the welding wire freely emerging from the said sleeve.

A similar welding apparatus is disclosed in German Utility Model No. G 69 45 152. In this apparatus the welding wire is melted in a substantially cylindrical effective heating space. According to a special embodiment the effective heating space is enlarged to form a cone towards the junction into the welding shoe.

Both apparatus have the disadvantage that the welding wire, which is heated to welding temperature by the supply of heat to its surface, remains cooler in the core because of the poor thermal conductivity of thermoplasts, so that a sufficient plasticizing is not obained. The after-heating of the welding wire as proposed in the Swiss patent or the cone-like enlargement of the effective heating space in accordance with the German utility model do not ensure the degree of plasticizing of the welding wire required for a satisfactory welding.

It is, therefore, an object of the present invention to provide an apparatus for welding in one step semi-finished articles and other objects of thermoplasts with a completely plasticized welding material made from a commercial wire of thermoplastic material.

According to the invention a welding apparatus is provided comprising feeding means and a melting device for the welding material, a welding shoe to be joined to the melting device with outlet opening for the plasticized welding material, a smoothing element and a guide element, as well as heating means for the melting device and for heating the joint, wherein the melting device is provided with a guide channel for the supply and preheating of the welding material, the guide channel merges into a melting channel of diminishing cross sectional area which is closed at one end and provided with lateral bores discharging into a melting chamber of low height, which chamber merges into a collecting zone or chamber which is in communication with the outlet opening of the welding shoe.

The melting chamber of low height can be axially symmetrical or may have a flat, cross-shaped or star-like cross section.

To heat the melting device, heating elements are preferably used. The joint can be preheated with hot air or with a radiator of appropriate heating characteristics. For preheating the joint especially good results can be obtained with a halogen lamp with corresponding reflector.

Figure 2:
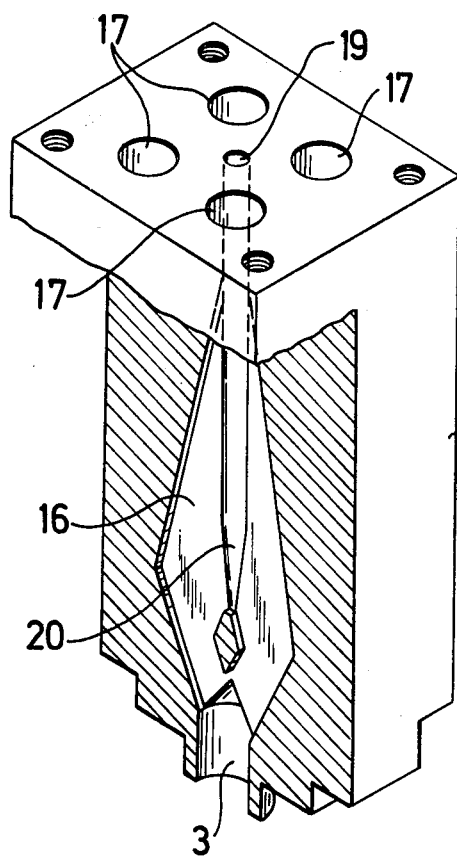
Figure 3:
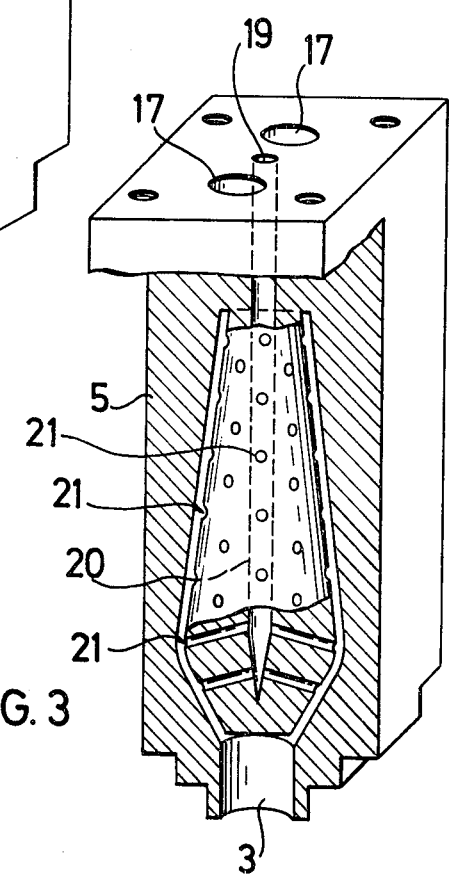

The apparatus according to the invention will now be described in greater detail by way of example with reference to the accompanying drawing in which FIG. 1 is a front view partially broken away of the welding apparatus, FIG. 2 represents the melting device 5 partially broken away, and FIG. 3 shows a modification of the melting device as shown in FIG. 2.

Welding head 1 carries the feeding means for the welding material 7 comprising pressure rolls 6 and friction roll 8. Friction roll 8 is connected with the driving motor, mounted in handle 10, via a gear or directly. Numeral 9 indicates a potentiometer with which the speed of the motor can be regulated. Numeral 4 indicates the connection for the current supply. The melting device or housing 5 is mounted at the welding head 1 adjacent to the outlet of the feeding means. The welding material 7 passes via the feeding means into the guide channel 19 where it is preheated and from where it is passed into melting channel 20. Melting channel 20 tapers at its lower end and is closed at said end. It is provided with lateral bores 21 which open up into a melting chamber 16 of low height, i.e., the chamber, as seen in the drawings, is narrow and has a flat shape. Chamber 16 merges into a collecting zone or chamber 3 discharging into the outlet opening 2 of the welding shoe 11. Welding shoe 11 substantially corresponds to the subject of German Pat. No. 1,704,043. The automatic advance in the welding apparatus is achieved by the pressure of the welding material on nose 13 of the welding shoe projecting into joint 12. Numeral 17 indicates the chambers for the heating means of the melting device. Cartridge type electrical heaters can be pushed into said chambers. Welding head 1 is further provided with the heating means for joint 12 comprising an electrical lamp, preferably a halogen lamp 14, and a reflector 15. Numeral 18 indicates a handle.

In FIGS. 1 and 2 melting chamber 16 of low height has a flat shape, while in FIG. 3 said chamber 16 is axially symmetrical. On FIG. 3 the lateral bores 21 of the melting channel 20 can be seen.

What is claimed is:

1. In an apparatus for welding thermoplastic articles with additional welding material comprising a welding head including feeding means for feeding a rod of welding material through the head, a melting housing for the welding materials mounted on said welding head and receiving said welding material therefrom, and a welding shoe mounted on the melting housing and having an outlet opening formed therein for receiving and discharging plasticized welding material from the welding housing, said shoe including a smoothing element, a guide element for guiding the apparatus along a point to be welded, and heating means for heating the joint to be welded, the improvement comprising said melting housing having a guide channel, a melting channel, a melting chamber and a collecting chamber formed therein, said melting channel being located to receive said welding material from said feeding means and for preheating the welding material, said melting channel communicating at one end with said guide channel and having a diminishing cross-sectional area and being closed at its other end, said melting channel being in communication with said melting chamber to discharge welding material heated in the melting channel into said melting chamber, said melting chamber being located in communication with said collecting chamber which is in communication with said outlet opening of the welding shoe, and heating means in said housing for heating welding material in said melting channel and melting chamber.

2. Apparatus as claimed in claim 1, wherein the melting chamber is axially symmetrical in the direction of passage.

3. Apparatus as claimed in claim 1, wherein the melting chamber has a flat cross section in the direction of passage.

4. Apparatus as claimed in claim 1, wherein the melting chamber has a cross-shaped cross section in the passage direction.

5. Apparatus as claimed in claim 1, wherein the melting chamber has a star-like cross section in the passage direction.

* * * * *